Dec. 16, 1958   E. P. HURD   2,864,654
WHEEL COVER
Filed Dec. 21, 1953   2 Sheets-Sheet 1
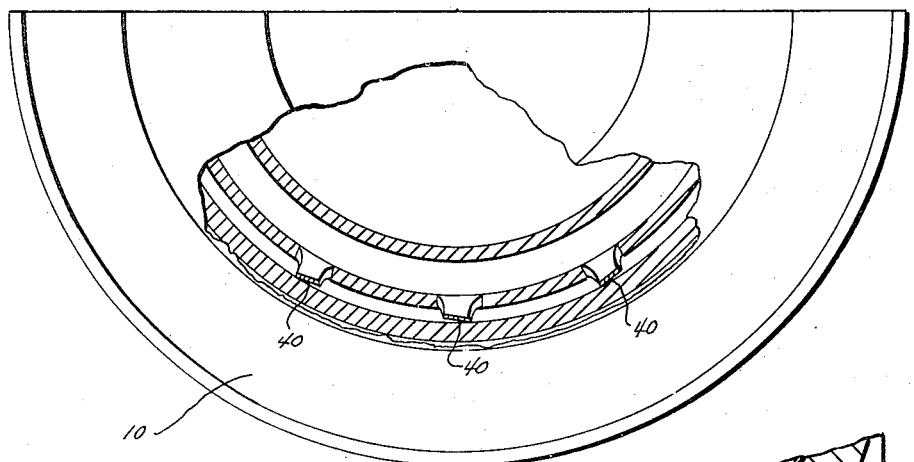
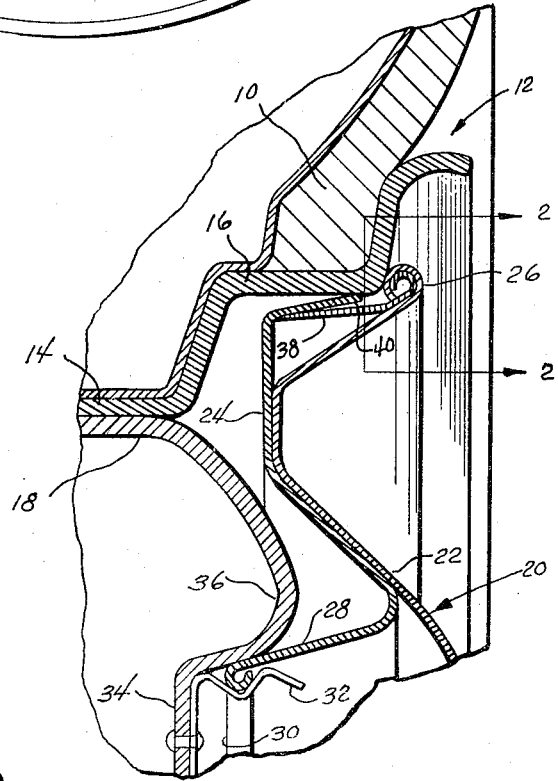
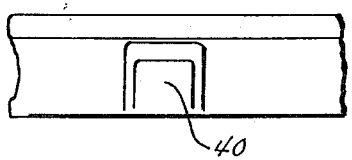
INVENTOR.
EDWIN P. HURD
BY SMITH, OLSEN & KOTTS
ATTORNEYS Dec. 16, 1958 E. P. HURD 2,864,654
WHEEL COVER
Filed Dec. 21, 1953 2 Sheets-Sheet 2
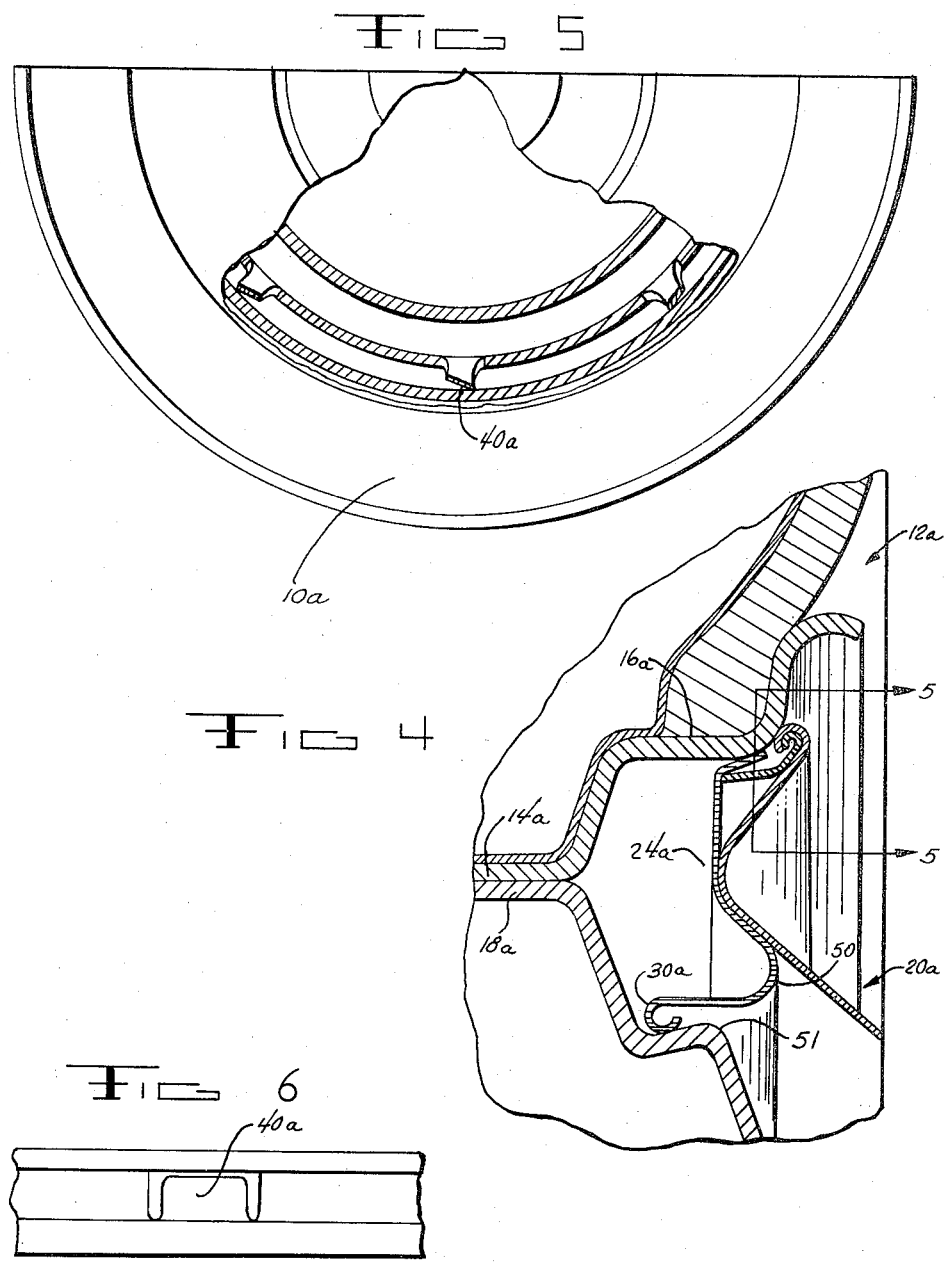
INVENTOR.
EDWIN P. HURD
BY SMITH, OLSEN & KOTTS
ATTORNEYS United States Patent Office 2,864,654
Patented Dec. 16, 1958

2,864,654

WHEEL COVER

Edwin P. Hurd, Detroit, Mich., assignor to Hurd Lock & Manufacturing Company, Detroit, Mich., a corporation of Michigan Application December 21, 1953, Serial No. 399,254

8 Claims. (Cl. 301—37)

The present invention relates to a wheel cover structure and assembly, and more particularly to a full wheel cover having an improved means for fastening it to the wheel assembly.

With the advent of full wheel covers on automobiles, it has generally been the practice to secure the covers to the wheel assemblies by means of biting fingers, or the like, which grip the rim portions of the assemblies. This construction is not always found satisfactory, especially when it may be necessary for the covers to be removed periodically. In such cases the fingers may be deformed or damaged so that thereafter they do not hold the covers properly in place.

Another form of attachment sometimes used in this art is that of fastening the cover to hub portions of the wheel. Constructions of this type also have had some shortcomings. In some instances they permit vibrations to occur producing noisy driving conditions. In others, the full wheel cover will come loose from the wheel when subjected to shocks resulting from the wheel assembly striking bumps in the road.

With the foregoing premises in mind, it is a principal object of the present invention to provide an improved full wheel cover which does not have the defects of the prior art, said cover having means by which the same can be secured in snap-on, pry-off relation to hub portions of the wheel and which has peripheral portions adapted to be in resilient engagement with rim portions of said wheel assembly so as to aid in cushioning any shocks which otherwise would be transmitted from the rim directly to the body of the wheel cover and to allow for tolerances between said cover and wheel assembly, said peripheral portions further being constructed and arranged to pilot said cover onto the wheel assembly to facilitate installing the cover in place.

It is another object of the present invention to provide an improved full wheel cover of the foregoing character in which the resilient peripheral portions are constructed and arranged to prevent relative rotation of the cover with respect to the rim.

Another object of the present invention is to provide a full wheel cover of the foregoing character which is formed from two sheet metal stampings nested together and interlocked by a rolled edge so that it can be economically manufactured.

It is still another object of this invention to provide a full wheel cover in combination with a wheel assembly in which the wheel has hub portions to which the cover can be attached in snap-on, pry-off relation and in which resilient means are provided between the rim and main body of the cover to cushion shocks that might otherwise cause the cover to be sprung from the wheel.

Other objects of this invention will appear in the following description and appended claims, reference being had to the accompanying drawings forming a part of this specification wherein like reference characters designate corresponding parts in the several views.

In the drawings:

Fig. 1 is a fragmentary sectional view of a combined wheel assembly and cover embodying features of the present invention;

Fig. 2 is a fragmentary front elevation drawn to a reduced scale of the structure shown in Fig. 1, the portions shown in section being taken substantially on the lines 2—2 of Fig. 1;

Fig. 3 is a fragmentary plan showing one of the tabs in the peripheral portion of the cover;

Fig. 4 is a fragmentary sectional view of a modified form of the invention;

Fig. 5 is a fragmentary front elevation drawn to a reduced scale of the structure shown in Fig. 4, the portions shown in section being taken substantially on the lines 5—5 of Fig. 4; and Fig. 6 is a fragmentary plan showing one of the tabs in the modified form of cover.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the embodiment shown in Figs. 1 to 3 will be described first. A tire and tube unit 10 is mounted on a drop center rim 12 having a base flange 14 and an intermediate flange 16. A central body or wheel part 18 is secured to said rim. The wheel and rim parts are well known constructions in the automobile industry and the specific details shown in the drawings do not constitute the present invention. It is to be understood that any convenional wheel and rim construction may be used with the present invention.

The full wheel cover 20 has a disk portion 22 which fully covers the wheel part 18 and the radially inner portions of the rim 12. The disk portion 22 is made preferably from stainless steel so that it will have an attractive ornamental appearance. The wheel cover 20 also has a concealed annulus 24 which is nested into the disk portion 22 and is interlocked therewith by the rolled outer edge 26. The annulus is made from a low carbon steel having resilient characteristics for purposes which will become readily apparent.

The radially inner portion of the annulus 24 has a rearwardly extending sleeve portion 28 which terminates in a rolled edge 30. The sleeve portion 28 may be cylindrical or frusto-conical, as the case may be, depending upon the shape and size of the wheel part 18, and it should be understood that the invention is not necessarily limited to a sleeve of the exact dimensions shown.

The wheel part 18 has a plurality of conventional retaining spring elements 32 secured in equally spaced circumferential relation around the fastening flange 34. The base of each spring element abuts against the inner edge of the outwardly projecting bead 36 so that the rolled edge 30 of the cover 20 can be resiliently held in place against the projecting bead 36 by the free end of spring element 32.

The spring elements 32 will hold the cover 20 on the wheel assembly under normal operating conditions, but as explained previously, under certain circumstances the cover 20 can be worked loose from the spring elements 32 if the wheel assembly is subjected to severe shocks imposed through the tire unit 10 and rim 12. If the cover 20 should come loose in this manner while the motor vehicle is in motion, it constitutes a hazard to pedestrians and other motor vehicles, and furthermore, the loss of the cover is a needless expense item to the owner of the vehicle.

One of the important features of the present invention is the novel arrangement employed to assure that the cover 20 will remain in place under the most severe driving conditions and still allow it to be readily pried from the wheel assembly when required. The annulus 24 has its radially outer portion shaped in a generally cylindrical shape as seen at 38. This cylindrical portion has a plurality of tabs 40 formed therein which are deflected radially outwardly. As best seen in Fig. 1, the cylindrical portion 38 has a smaller diameter than the intermediate flange 16 of rim 12 so that shocks imposed on rim 12 will not be transmitted directly to the cover 20. However, the tabs 40 when in their free positions have a greater diameter than that of intermediate flange 16 so that when cover 20 is pressed into operative position over the wheel assembly, the tabs 40 will be deflected inwardly and will provide a resilient joint between the cover 20 and the rim 12. Thus, these tabs will cushion any shocks which otherwise would be transmitted directly from the rim to the cover, and in this manner the cover 20 will not be sprung from the wheel assembly even under the most severe driving conditions.

The tabs 40 perform other functions in addition to those set forth above. The tabs are very effective for taking up tolerances which might exist between the wheel assemblies and covers, thereby assuring that each cover will always fit well on any particular wheel assembly with which it might be used. Also since the tabs extend generally in an axial outward direction they serve as an effective pilot for guiding the cover when being pressed onto the wheel assembly.

Another feature of the tabs 40 which may be used, if desired, is that of twisting the tabs 40 alternately in opposite directions to positions shown best in Figs. 1 and 2. By virtue of this construction and arrangement, the opposite edges of adjacent tabs will be in biting engagement with the intermediate flange 16, thus preventing relative rotation of cover 20 with respect to rim 12.

A second embodiment of the invention can be seen in Figs. 4, 5 and 6 of the drawings. This embodiment is substantially the same as that previously described, except that the annulus 24a has an inner rolled edge 30a and is shaped at 50 to produce spring characteristics that edge 30a will spring over three or more protrusions 51 formed circumferentially around the wheel part 18a in a manner well known in the art. Thus, this embodiment distinguishes from the previously described embodiment primarily in the use of the protrusions 51 in place of the spring elements 32 for retaining the cover 20 on the wheel assembly, and it has the same advantages in use as those described in connection with the first described embodiment.

From the foregoing description it can be seen that the present invention provides an improved wheel cover and assembly construction by which optimum results are derived from its use, and the cover can be constructed by simple stamping operations which enables it to be manufactured and sold at a low cost. Furthermore, the cover will fit on any mating wheel assembly by virtue of its resilient tab construction so that uniformly good operating characteristics will always be obtained from its use.

Having thus described my invention, I claim:

1. A wheel cover for disposition over a wheel and inwardly of the wheel rim, comprising a circular ornamental disk adapted to conceal the wheel and inner parts of the rim, an annulus in nested relation with said disk and having its radially outer periphery interlocked with said disk, the radially inner periphery of said annulus extending axially inwardly and adapted to be placed in resilient engagement with central portions of said wheel, said annulus having a plurality of resilient tabs equally spaced around its periphery and adapted to be pressed into engagement with the rim for aiding in cushioning the wheel cover on the rim said tabs being alternately twisted in opposite directions so as to permit alternating edges to be in biting engagement with said rim thereby preventing rotation of the cover relative to the wheel and rim.

2. In a wheel assembly including a wheel having a plurality of spaced wheel cover retaining means formed in its central portion and a drop center rim having an intermediate base flange, a circular ornamental disk disposed over said wheel and the intermediate base flange of said rim, and an annulus in nested relation with said disk and having its radially outer periphery interlocked with said disk, the radially inner periphery of said annulus extending toward said wheel and into snap-on, pry-off engagement with said retaining means, said annulus having a generally cylindrical portion adapted to telescope within said intermediate base flange and a plurality of tabs deflected radially outwardly from said cylindrical portion into resilient engagement with said intermediate base flange, said tabs having their distal ends extending axially outwardly and at least some of said tabs being twisted on their axes so that the radially outermost edges will bite into said base flange and prevent rotation of said cover relative to the rim.

3. As an article of manufacture, a wheel cover comprising a circular disk formed from stainless steel sheet metal, an annulus formed from low carbon steel sheet metal nested to the rear side of said disk and having its outer edge interlocked with that of the disk by a rolled edge, the radially inner portion of said annulus being bent axially rearwardly to form a sleeve-like part terminating in a rolled edge, an intermediate portion of said annulus having an annular shoulder the radially outer portion of which has a plurality of tabs cut therein so that the distal ends point toward the circular disk, said tabs being deflected radially outwardly and being twisted a small degree about their axes.

4. In combination, a wheel having a central portion with radially outwardly directed spaced protuberances, a drop center rim attached to said wheel and having an intermediate base flange, and a wheel cover comprising a circular disk disposed over said wheel and the intermediate base flange of said rim, and an annulus in nested relation with said disk having its radially outer periphery secured to the latter, the radially inner periphery of said annulus extending rearwardly into snap-on, pry-off engagement with said protuberances, said annulus having a generally cylindrical portion telescoping within said intermediate base flange and a plurality of tabs deflected from said cylindrical portion into resilient engagement with said intermediate base flange, said inner periphery and cylindrical portions being radially spaced apart and joined by a radially extending segment so that vertical road shocks received by the rim will be absorbed and cushioned by said tabs without being transmitted from the rim directly to the inner periphery of said annulus.

5. In combination, a wheel having a central portion with a plurality of circumferentially spaced protuberances, a drop center rim attached to said wheel and having an intermediate base flange, and a wheel cover comprising a circular disk disposed over said wheel and the intermediate base flange of said rim, and an annulus fastened to said disk in nested relation, the radially inner periphery of said annulus extending rearwardly into snap-on, pry-off engagement with said protuberances, said annulus having a generally cylindrical portion telescoping within said intermediate base flange and a plurality of resilient members deflected from said cylindrical portion radially outwardly into resilient engagement with said intermediate base flange, said inner periphery and cylindrical portions being radially spaced apart and joined by a radially extending segment so that vertical road shocks received by the rim will be absorbed and cushioned by said members without being transmitted from the rim directly to the inner periphery of said annulus.

6. In a wheel assembly including a wheel with a central part having a plurality of circumferentially spaced wheel cover retaining means and a drop center rim having an intermediate base flange, a wheel cover having a resilient rearwardly extending annular flange portion fastened to said retaining means, and an annular shoulder portion intermediate the outer periphery and the annular flange portion and telescoping into the intermediate base flange, said last named portion having a plurality of tabs bent radially outwardly and extending axially forward with longitudinal edges thereof in engagement with said intermediate base flange.

7. As an article of manufacture, a wheel cover comprising a circular disk with an annular concave portion adjacent its outer periphery, and an annulus nested to the rear side of said disk and having its outer edge interlocked with that of the disk, the radially inner portion of said annulus being bent axially rearwardly to form a sleeve-like part adapted to be attached to a central part of a wheel, the forward edge of said sleeve-like part turning radially outwardly into engagement with said disk and following the contour thereof until reaching the rearward extremity of said concave portion, thereafter the annulus being spaced from the disk until adjacent said interlocked edge so as to form an annular shoulder portion, the radially outer portion of which has a plurality of outwardly deflected tabs adapted to engage a rim of a wheel.

8. As an article of manufacture, a wheel cover comprising a circular disk formed from stainless steel sheet metal and having an annular concave portion adjacent its outer periphery, and an annulus formed from low carbon steel sheet metal nested to the rear side of said disk and having its outer edge interlocked with that of the disk, the radially inner portion of said annulus being bent axially rearwardly to form a sleeve-like part adapted to be attached to a central part of a wheel, the forward edge of said sleeve-like part turning radially outwardly into engagement with said disk and following the contour thereof until reaching the rearward extremity of said concave portion, thereafter the annulus being spaced from the disk until adjacent the interlocked edge so as to form an annular shoulder portion, the radially outer portion of which has a plurality of tabs cut therein so that the distal ends point toward the circular disk, said tabs being deflected radially outwardly.

References Cited in the file of this patent

UNITED STATES PATENTS

| | | |
|---|---|---|
| 2,244,913 | Lyon | June 10, 1941 |
| 2,306,631 | Lyon | Dec. 29, 1942 |
| 2,550,222 | Carlin | Apr. 24, 1951 |
| 2,569,483 | Lyon | Oct. 2, 1951 |
| 2,574,491 | Lyon | Nov. 13, 1951 |
| 2,601,209 | Lyon | June 17, 1952 |
| 2,607,632 | Lyon | Aug. 19, 1952 |